United States Patent
Yamashita et al.

(10) Patent No.: US 7,840,016 B2
(45) Date of Patent: Nov. 23, 2010

(54) SOUND CONTROL SYSTEM

(75) Inventors: Shinjiro Yamashita, Shizuoka-ken (JP); Kengo Takahashi, Shizuoka-ken (JP)

(73) Assignee: Yamaha Corporation, Shizuoka-Ken (JP)

( * ) Notice: Subject to any disclaimer, the term of this patent is extended or adjusted under 35 U.S.C. 154(b) by 1103 days.

(21) Appl. No.: 10/798,939

(22) Filed: Mar. 11, 2004

(65) Prior Publication Data
US 2004/0179704 A1    Sep. 16, 2004

(30) Foreign Application Priority Data
Mar. 11, 2003    (JP) .............................. 2003-065655

(51) Int. Cl.
*H04B 1/00* (2006.01)
(52) U.S. Cl. ........................................ 381/119; 700/94
(58) Field of Classification Search ................. 381/119; 700/94; 709/208–211, 217–219; 84/660; 369/4
See application file for complete search history.

(56) References Cited

U.S. PATENT DOCUMENTS

| | | | | |
|---|---|---|---|---|
| 4,479,240 A | * | 10/1984 | McKinley, Jr. ................ | 381/80 |
| 5,778,417 A | * | 7/1998 | Kentish et al. ............... | 711/100 |
| 5,940,521 A | * | 8/1999 | East et al. .................... | 381/119 |
| 6,816,833 B1 | * | 11/2004 | Iwamoto et al. ............. | 704/207 |
| 7,245,727 B2 | * | 7/2007 | Cresci et al. ................. | 381/119 |
| 2002/0156547 A1 | | 10/2002 | Suyama et al. | |
| 2003/0055518 A1 | * | 3/2003 | Aiso et al. .................... | 700/94 |
| 2004/0024478 A1 | * | 2/2004 | Hans et al. .................... | 700/94 |

FOREIGN PATENT DOCUMENTS

| JP | 08-051674 | 2/1996 |
|---|---|---|
| JP | 2000-209037 | 7/2000 |

* cited by examiner

*Primary Examiner*—Vivian Chin
*Assistant Examiner*—Fatimat O Olaniran
(74) *Attorney, Agent, or Firm*—Harness, Dickey & Pierce, PLC (57) ABSTRACT

A sound control system includes a digital mixing system, a control system, and a private control system. The professional operator who is experienced in handling of the digital mixing system executes detailed settings of respective parameters associated with the mixing process of the digital mixing system by using the control system. The amateur operator who is inexperienced in the handling of the digital mixing system executes settings of a part of parameters out of the parameters that are authorized by the professional operator, etc. by using the private control system.

11 Claims, 8 Drawing Sheets

SOUND CONTROL SYSTEM

BACKGROUND OF THE INVENTION

The present invention relates to a sound control system for controlling sound facilities in various halls, and so forth.

In the halls for the concert, the drama, etc., the mixing unit for controlling various sound facilities is widely used. A number of microphones and speakers are used as such sound facilities, and a wide variety of presentations are executed by utilizing appropriately the sound effect, and so forth. The mixing unit controls concentratedly what mixing process should be applied to a plurality of sound signals input via a number of input systems, what effect should be produced, and from which output system the sound signals should be output.

By the way, in recent years, an enormous size increase of the sound system employed in the halls is accelerated, and the number of channels of the sound signals to which the mixing process is applied by the mixing unit becomes huge. According to this, the configuration of the recent mixing unit becomes complicated more and more such that a large number of operating pieces (operation knobs, operation buttons, etc.) are provided on the panel. Therefore, the considerable experience is required to handle the mixing unit.

For the above reasons, the mixing unit having functions of storing plural sets of setting states of respective parameters (detailed setting information) associated with the mixing process in answer to respective scenes, etc., and then reproducing simply the setting states by calling any detailed setting information stored is now spread as the recent mixing unit.

As the method of calling the detailed setting information, for example, the method of incrementing/decrementing the scene number one by one by using the INC/DEC switch and calling the detailed setting information corresponding to the incremented/decremented scene is employed.

However, in such mixing unit, the detailed setting information concerning all successive scene numbers are not always stored. In other words, the scene numbers the detailed setting information of which is not stored are present. Nevertheless, respective scene numbers including the scene numbers the detailed setting information of which are not stored must be incremented/decremented one by one by using the INC/DEC switch to input the desired scene number. Therefore, there existed the problem that the operations become very troublesome.

In order to overcome such problem, there has been proposed the technology that increments/decrements automatically the subsequent scene number unless the detailed setting information of the scene number is stored when the scene number is incremented/decremented by operating the INC/DEC switch. According to such technology, since the scene number the detailed setting information of which is not stored is skipped automatically, the particular detailed setting information can be called by the simple operation (for example, see Patent Literature 1).

Patent Literature 1
US2002/0156547

However, the detailed setting information called as described above is not always utilized at that setting (i.e., the setting is not changed at all). For instance, in the sound effect reproduction, etc. of the drama, parameters such as the effect of the input channels, the assignment of the output speakers, etc. out of respective parameters indicated in the detailed setting information and associated with the mixing process must be switched frequently. When the scene is changed, the setting of the assignment of the output speakers must be operated every time. In addition, since the sound conditions such as the stage speakers, etc. are changed because of the influence of the stage setting, the quality of sound and the level must be adjusted.

In the related art, in order to change the settings of such parameters, after all the expert who is experienced in handling of the mixing unit (referred to as a "professional operator" hereinafter) must operate appropriately respective operating pieces of the mixing unit to change such settings. While the amateur who is inexperienced in the handling of the mixing unit (referred to as an "amateur operator" hereinafter) could not get desired setting states by changing the settings of the parameters.

SUMMARY OF THE INVENTION

The present invention has been made in view of the above mentioned circumstances, and it is an object of the present invention to provide a sound control system for permitting even an amateur operator to execute easily setting operations of respective parameters associated with the mixing process.

In order to solve the aforesaid object, the invention is characterized by having the following arrangement.

(1) A sound control system comprising:
  a mixing unit which applies a mixing process to a plurality of sound signals input from a plurality of input systems, and outputs resultant signals to a plurality of output systems;
  a storing device which stores plural sets of detailed setting information to indicate setting states of respective parameters associated with the mixing process; and
  a simple control unit which sets of a part of parameters out of respective parameters;
    wherein the simple control unit includes
    a plurality of operating pieces, and
    an instruction transmitting unit which transmits an input calling instruction to the mixing unit when a calling instruction of a certain detailed setting information is input via any operating piece out of the plurality of operating pieces, and
    the mixing unit includes
    a receiving unit which receives the calling instruction of the certain detailed setting information from the simple control unit, and
    a deciding unit which decides an authorization parameter that the simple control unit is authorized to set among a plurality of parameters indicated in the certain detailed setting information and associated with the mixing process.

(2) The sound control system according to (1), wherein an authorization parameter identifying information to identify a parameter that the simple control unit is authorized to set is contained in the detailed setting information.

(3) The sound control system according to (2) further comprising:
  an information generating device which generates the detailed setting information in response to an input operation, and stores a generated detailed information in the storing device.

(4) A sound control system comprising:
  a mixing unit which applies a mixing process to a plurality of sound signals input from a plurality of input systems, and outputs resultant signals to a plurality of output systems;
  a storing device which stores plural sets of detailed setting information to indicate setting states of respective parameters associated with the mixing process; and a simple control unit which sets a part of parameters out of respective parameters;

wherein the simple control unit includes
a plurality of operating pieces,
an instruction transmitting unit which transmits an input calling instruction to the mixing unit when a calling instruction of a certain detailed setting information is input via any operating piece out of the plurality of operating pieces, and
an assigning unit which receives an authorization parameter information corresponding to the calling instruction from the mixing unit, and assigning an authorization parameter to the operating pieces based on the received authorization parameter information, and
the mixing unit includes
a receiving unit which receives the calling instruction from the simple control unit, and
a transmitting unit which decides an authorization parameter that the simple control unit is authorized to set among a plurality of parameters indicated in the certain detailed setting information and associated with the mixing process, and transmits the authorization parameter to the simple control unit as the authorization parameter information.

(5) The sound control system according to (4), wherein an operating piece assigning information to identify an operating piece to which the authorization parameter is assigned is contained in the authorization parameter information.

(6) The sound control system according to claim 4, wherein an authorization parameter identifying information to identify a parameter that the simple control unit is authorized to set is contained in the detailed setting information.

(7) The sound control system according to (4), wherein, when a plurality of simple control units are equipped, the transmitting unit decides the authorization parameter for respective simple control units in such a manner that the authorization parameter is decided differently among respective simple control units.

(8) The sound control system according to (4), further comprising:

an information generating device which generates the detailed setting information in response to an input operation, and then storing a generated detailed information in the storing device.

DETAILED DESCRIPTION OF PREFERRED EMBODIMENTS

Embodiments according to the present invention will be explained with reference to the drawings hereinafter.

A. Present Embodiment (1) Configuration of the Embodiment

Figure 1:
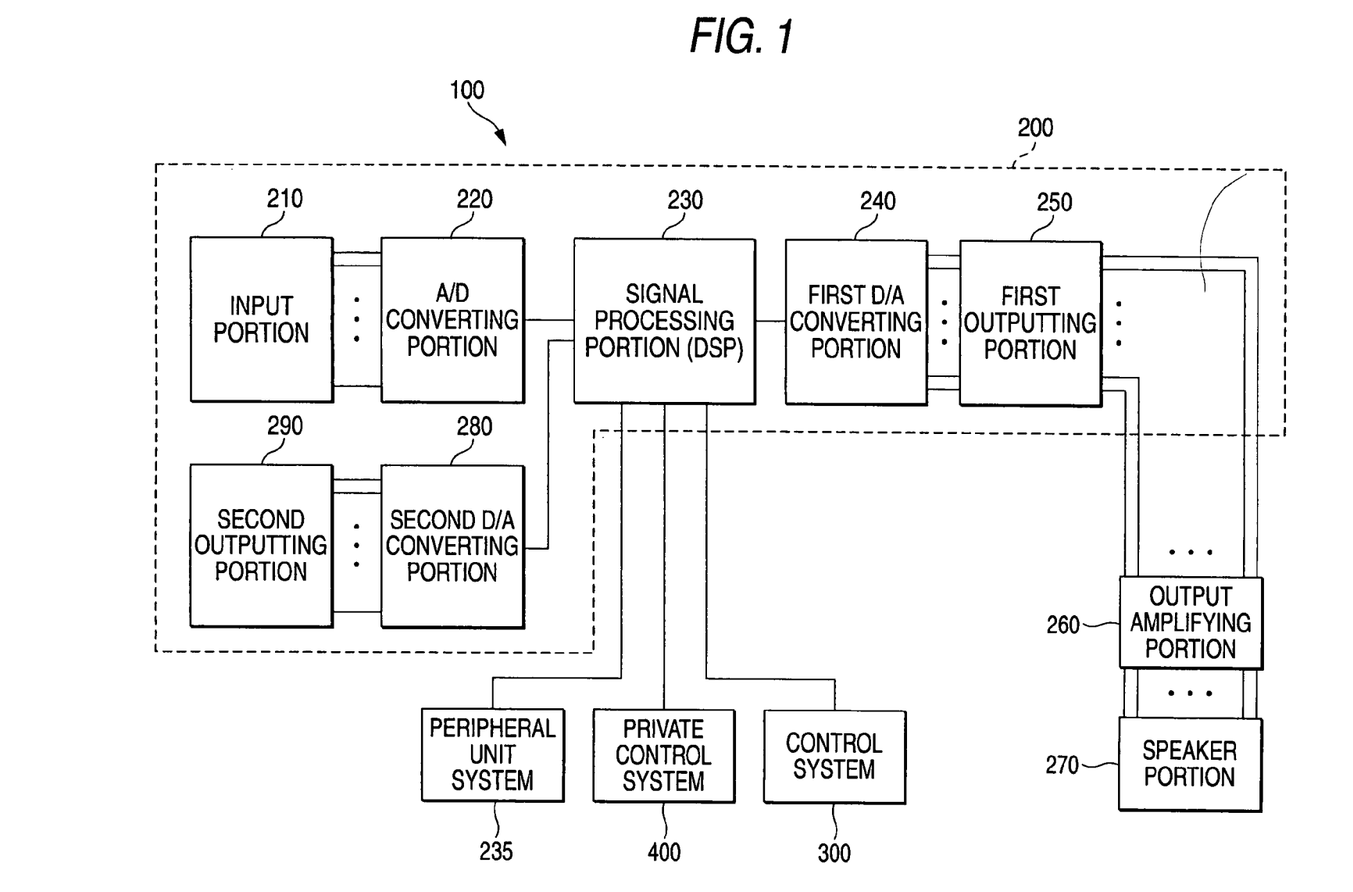
FIG. 1 is a diagram showing a functional configuration of a sound control system according to the present embodiment.

FIG. 1 is a diagram showing a functional configuration of a sound control system 100 according to the present embodiment.

The sound control system 100 is constructed by a digital mixing system 200, a control system 300, a private control system 400, and so on.

The sound control system 100 according to the present embodiment permits the professional operator to execute detailed settings of respective parameters associated with the mixing process of the digital mixing system 200 by using the control system 300, while permits the amateur operator to execute the settings of a part of parameters out of respective parameters, etc. by using the private control system 400.

The digital mixing system 200 has a role to apply any mixing process to a plurality of sound signals input from a plurality of input systems, and then output resultant sound signals to a plurality of output systems.

An input portion 210 is constructed by a plurality of input connectors, etc., and has a role to input analog sound signals that are supplied from microphones (not shown), which are installed to the stage, coulisses of the stage, seats in the hall, etc., via respective input connectors.

An A/D converting portion 220 is constructed by A/D converting boards, etc., and has a role to convert the analog sound signals input via the input portion 210 into digital sound signals and then output resultant signals.

A signal processing portion (DSP) 230 has a role to apply any mixing process to a plurality of input digital sound signals, in compliance with the instruction (details will be described later) issued from the control system 300 and the private control system 400. In this case, as the input digital sound signals, there are sound signals input from peripheral unit systems 235 such as the DAT (Digital Audio Tape) player, the CD (Compact Disc) player, etc. (not shown), in addition to the sound signals input from the microphones via the input portion 210.

A first D/A converting portion 240 converts the digital sound signals, which are subjected to the above mixing process and output from the signal processing portion 230, into the analog sound signals.

A first outputting portion 250 is constructed by a plurality of output connectors, etc., and outputs the analog sound signals supplied sequentially from the first D/A converting portion 240 to an output amplifying portion 260. Incidentally, the digital sound signals that are subjected to the above mixing process and are output from the signal processing portion 230 can be output to the external device via external digital output terminals (not shown).

The output amplifying portion 260 is constructed by power amplifiers, etc., and amplifies appropriately the analog sound signals supplied from the first outputting portion 250 and then output resultant signals to a speaker portion 270.

Figure 2:
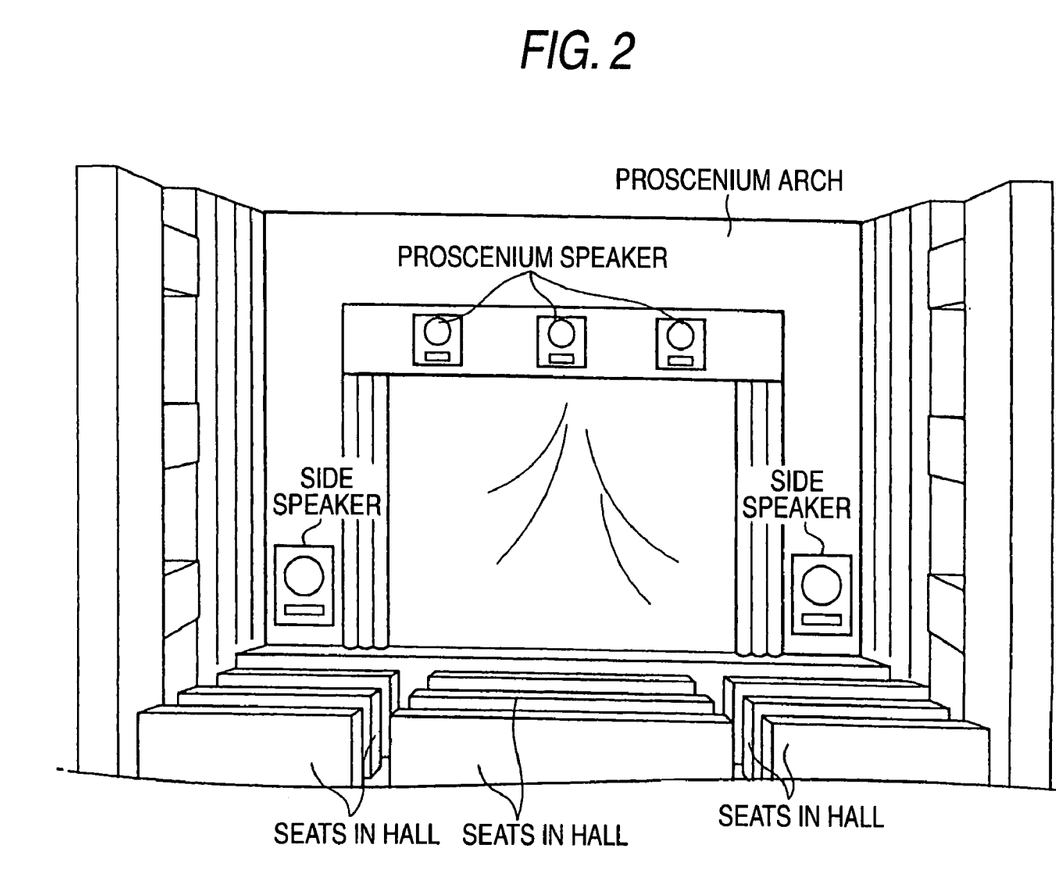
FIG. 2 is a view showing an example of speaker arrangement according to the present embodiment.

The speaker portion 270 is constructed by a variety of speakers such as the proscenium speakers, the side speakers, the wall speakers, and so on, which can provide musical sounds corresponding to above sound signals to an audience, etc. In this case, the proscenium speaker signifies a speaker that is arranged on the top portion of the proscenium arch (see FIG. 2), the side speaker signifies a speaker that is arranged on both sides of the proscenium arch, and the wall speaker signifies a speaker that is arranged to be buried in side walls and rear walls (not shown) of the seats in the hall.

Normally, in the place of meeting such as the hall, etc., not only the speakers are arranged on the audience side but also the speakers are arranged on the stage side. The speakers arranged on the stage side include the stage speaker, the monitor speaker, etc. (both not shown). These speakers arranged on the stage side are connected to a second outputting portion 290.

The second outputting portion 290 outputs the analog sound signals, which are supplied from the signal processing portion 230 via a second D/A converting portion 280, to above respective speakers. In this case, a function itself of the second D/A converting portion 280 is similar to that of the first D/A converting portion 240, and its explanation will be omitted herein.

The control system 300 is operated by the professional operator who is experienced in handling of the digital mixing system 200, and is constructed by a normal personal computer, or the like. This control system 300 has a function of transmitting/receiving various data to/from the signal processing portion 230 of the digital mixing system 200 via a cable (or radio), and has a function of generating the detailed setting information to indicate the setting states of respective parameters associated with the mixing process, etc. and storing them.

To mention a single example, in the scene of the lecture, or the like, for instance, the settings to turn up a sound volume of the proscenium speakers while turn down a sound volume of the side speakers must be employed as the setting of the output speakers. In addition, not only the settings of the output speakers but also selective settings of the microphones connected to the inputs, peripheral units, etc., settings of respective input channels (effects, faders, output destinations, output levels, etc. in respective channels), settings of respective output channels (effects, faders, input sources of matrix output channels, input levels, etc. in respective channels), setting of the built-in effector, setting of the equalizer, and so on must be executed.

The professional operator executes the setting of respective above parameters by utilizing the keyboard, etc. of the control system 300, and then executes the setting of the parameters that the private control system 400 is authorized to set. As the parameters that the private control system 400 is authorized to set, the professional operator selects the sound volumes of the output speakers, the built-in equalizer, and the built-in effector. After such selection is completed, detailed setting information containing the authorization parameter identifying information to identify the parameters that the control system is authorized to set are generated by the control system 300.

Figure 3:
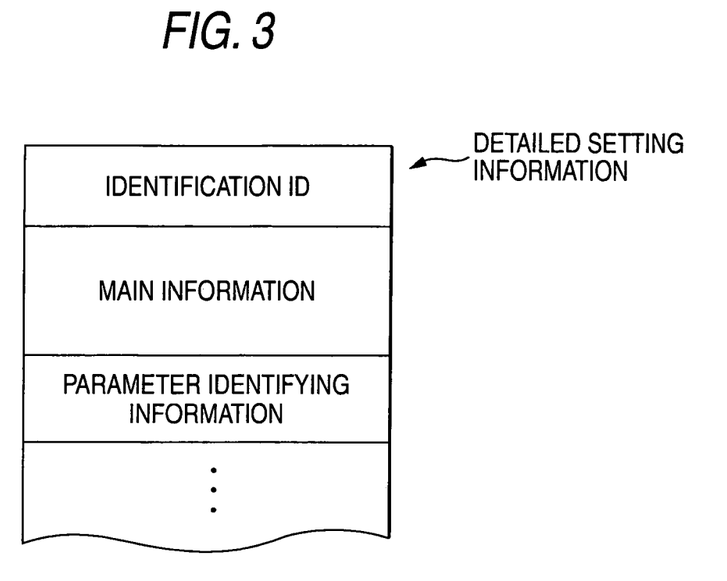
FIG. 3 is a view showing an example of contents of detailed setting information according to the present embodiment.

FIG. 3 is a view showing an example of contents of detailed setting information.

The detailed setting information is constructed by an identification ID to identify the concerned detailed setting information, main information to indicate the setting states of respective parameters, authorization parameter identifying information, etc.

When such detailed setting information is generated by the control system 300, the generated detailed setting information is stored sequentially in the storing device (e.g., hard disc) installed in the control system 300 or the storing medium such as FD, CD, or the like.

Figure 4:
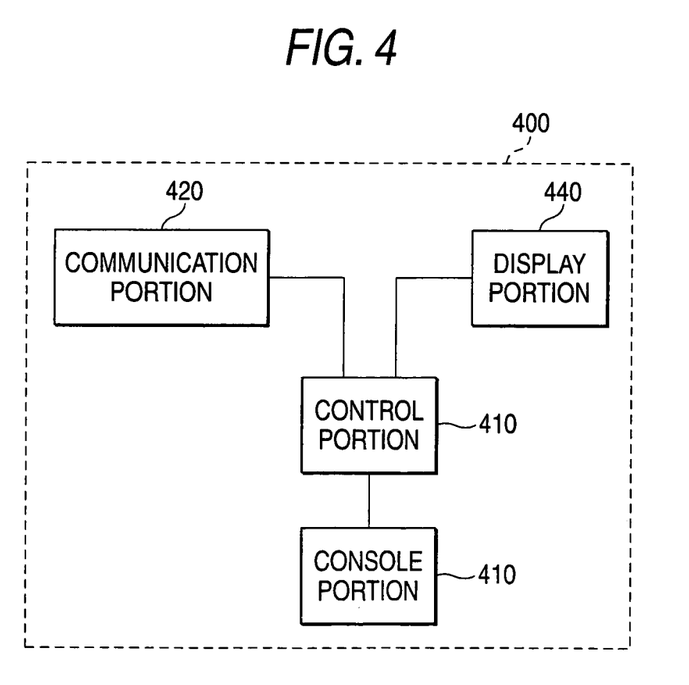
FIG. 4 is a view showing a configuration of a private control system according to the present embodiment.

The private control system 400 is a system that is operated by the amateur operator who is inexperienced in the handing of the digital mixing system 200. As shown in FIG. 4, the private control system 400 is constructed by a control portion 410, a communication portion 420, a console panel 430, a display portion 440, etc.

The control portion 410 is constructed by CPU, ROM, RAM, and others, and controls pivotally respective portions of the private control system 400.

The communication portion 420 is constructed by various communication interfaces, etc. and has a role to transmit/receive various data to/from the signal processing portion 230 of the digital mixing system 200 via the cable (or radio).

The console panel 430 is constructed by various operating pieces described later, and permits the amateur operator to set a part of above parameters when such amateur operator operates appropriately such operating pieces.

The display portion 440 is constructed by a display panel, various display meters, etc., and has a role to display the setting states of a part of above parameters, etc.

Figure 5:
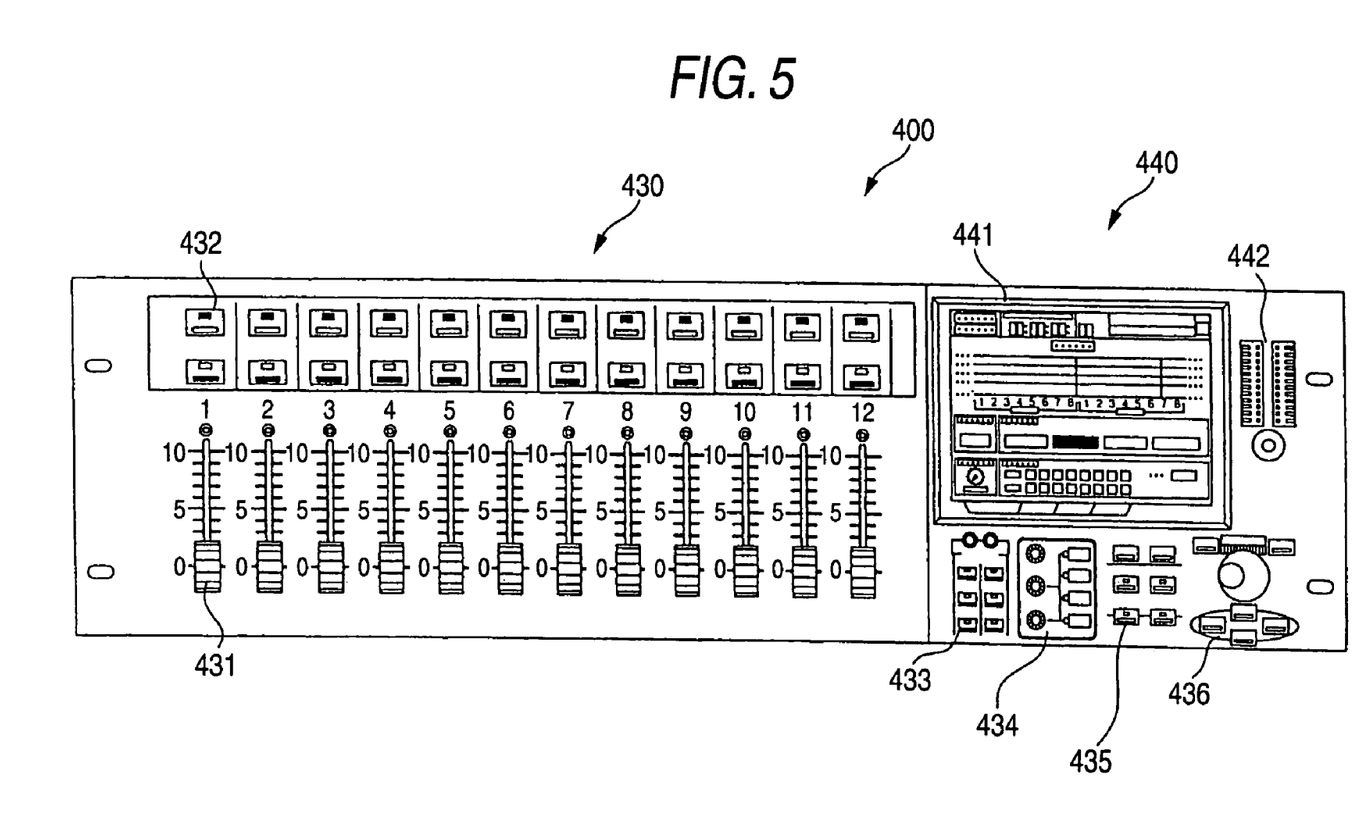
FIG. 5 is a view explaining a console panel and a display portion of the private control system according to the present embodiment.

Here, FIG. 5 is a view explaining the console panel 430 and the display portion 440.

The console panel 430 is constructed by fader knobs 431, ON/OFF SEL buttons 432, SEND/RETURN buttons 433, EQ buttons 434, EFFECTOR buttons 435, YES/NO DIAL CURSOR buttons 436, and so on.

A function of each fader knob 431 is changed in response to the type of the authorization parameter to be set, etc. For instance, if the parameter to be set is of sound volumes of the input microphones, a function of adjusting a sound volume of the first microphone is assigned to the first fader knob 431 on the leftmost side shown in FIG. 5, a function of adjusting a sound volume of the second microphone is assigned to the second fader knob 431 on the right next side, . . . , a function of adjusting a sound volume of the n-th microphone is assigned to the n-th fader knob 431. On the other hand, if the parameter to be set is of sound volumes of the output microphones, a function of adjusting a sound volume of the first speaker is assigned to the first fader knob 431, a function of adjusting a sound volume of the second speaker is assigned to the second fader knob 431, . . . , a function of adjusting a sound volume of the n-th speaker is assigned to the n-th fader knob 431.

The ON/OFF SEL button 432 is a button that designates the detailed setting information to be called, switches the ON/OFF state, etc.

The SEND/RETURN button 433 is a button that designates the output destination of the sound signals that are subjected to the mixing process by the digital mixing system 200, the input source of the matrix output channels, etc.

The EQ button 434 and the EFFECTOR button 435 are buttons that execute the setting of the built-in equalizer and the built-in effector in the digital mixing system 200 respectively, etc.

The YES/NO DIAL CURSOR button 436 is a button that fixes contents of the setting of the parameters by the amateur operator (for example, contents of the setting displayed on a display panel 441), etc.

The amateur-operator can set the authorization parameters that the concerned private control system 400 is authorized to set (e.g., sound volumes of the output speakers, etc.; referred appropriately to as an "authorization parameter" hereinafter) by operating appropriately the operation knobs, the operation buttons, etc. constituting the console panel 430 (the details will be described later).

In this case, the SEND/RETURN button 433, the EQ button 434, etc. do not always function effectively, but they can function effectively only when the concerned private control system 400 is authorized to set corresponding parameters. If the EQ button 434 is explained by way of example, the operation of the EQ button 434 is accepted only when the private control system 400 is authorized to set the built-in equalizer, etc. However, when the private control system 400 is not authorized to set the built-in equalizer, etc., such operation is not accepted even though the EQ buttons 434 are operated.

The display portion 440 includes the display panel 441 and a display meter 442. Frequency characteristics of the sound signals, etc. are displayed on the display panel 441, while setting levels of the selected parameters (e.g., sound volumes of the output speakers operated by using the fader knobs 431) are displayed on the display meter 442.

With the above, the detailed configuration of the sound control system 100 according to the present embodiment is explained.

Next, an operation of such sound control system 100 will be explained in detail hereunder.

(2) Operation of the Embodiment

<Generating/Storing Operations of the Detailed Setting Information by the Control System 300>

The professional operator who attempts to set the optimal control of the sound facilities in some scene, etc. sets respective parameters associated with the mixing process in that scene by utilizing the keyboard, etc. of the control system 300. More particularly, in the scene of putting a musical, or the like on the stage, the professional operator turns up the sound volume of the proscenium speakers and turns down the sound volume of the side speakers by utilizing the keyboard, etc. as the setting of the output speakers. In addition, the professional operator executes the setting of all parameters associated with the mixing process such as the selective setting of the microphones connected to the inputs, the peripheral units, etc.

After the professional operator executed the setting of respective parameters, such professional operator executes the selection of the parameter that the private control system 400 is authorized to set (the authorization parameter) by utilizing the keyboard, etc. After such selection is carried out, the detailed setting information containing the authorization parameter identifying information to identify the authorization parameter (see FIG. 3) is generated in the control system 300.

The detailed setting information generated in this manner are stored in the hard disc installed in the control system 300, etc.

The professional operator plural pieces of optimum detailed setting information in each scene by utilizing the control system 300, and then stores them in the hard disc, etc.

<Setting Operation of the Authorization Parameter by the Private Control System 400>

The amateur operator executes the calling of the optimum detailed setting information in response to the use of the hall (e.g., mounting of a musical), etc. In more detail, first the amateur operator inputs the identification IDs (identification ID1, etc.) to identify the detailed setting information (detailed setting information 1, etc.) to be called, by operating appropriately the ON/OFF SEL buttons 432 of the private control system 400. The control portion 410 of the private control system 400 receives such identification ID via the console panel 430, and then sends this identification ID to the signal processing portion 230 of the digital mixing system 200 via the communication portion 420 (see FIG. 1).

Figure 6:
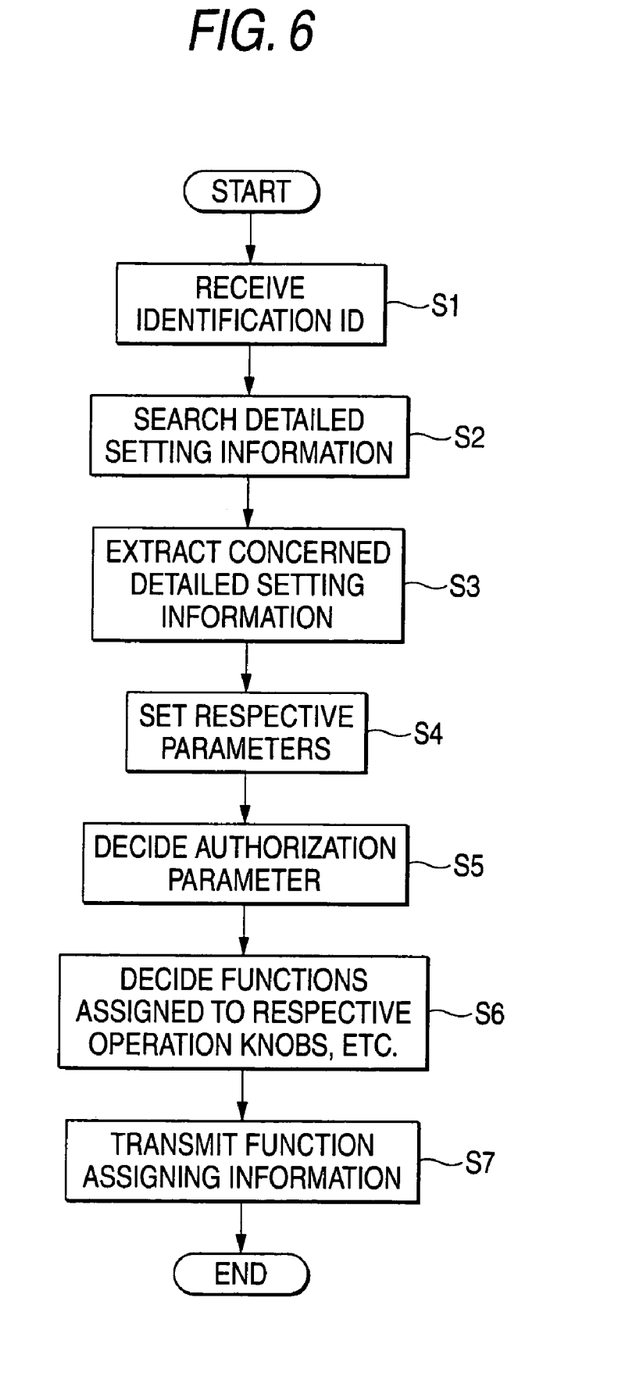
FIG. 6 is a view explaining a receiving process executed by a signal processing portion according to the present embodiment.

The signal processing portion 230 receives the identification ID from the private control system 400, and then executes a receiving process shown in FIG. 6.

First, the signal processing portion 230 searches plural pieces of the detailed setting information stored in the hard disc, etc. of the control system 300 while using the received identification ID as a search key (step S1→step S2). Then, the signal processing portion 230 finds the identification ID that coincides with the received identification ID, and extracts the detailed setting information corresponding to the concerned identification ID (step S3). Then, the signal processing portion 230 executes the setting of respective parameters in compliance with the main information indicating the setting states of respective parameters associated with the mixing process in the extracted detailed setting information (step S4), and then decides the authorization parameter in compliance with the authorization parameter identifying information contained in the detailed setting information (step S5).

For instance, in case the authorization parameter identifying information corresponds to the information to the effect that the setting of the sound volume of the output speakers, the built-in equalizer, and the built-in effector is allowed, these parameters (i.e., a part of parameters out of all parameters associated with the mixing process) are decided as the authorization parameters.

When the signal processing portion 230 decides the authorization parameters in this manner, it decides functions that are assigned to respective operation knobs (e.g., the fader knob 431), etc. of the private control system 400 (step S6). By way of example, a function of adjusting the sound volume of the first microphone is assigned to the first fader knob 431 on the leftmost side shown in FIG. 5, a function of adjusting the sound volume of the second microphone is assigned to the second fader knob 431 on the right next side, . . . , a function of adjusting the sound volume of the n-th microphone is assigned to the n-th fader knob 431. When the signal processing portion 230 decides the functions to be assigned to respective operation knobs, etc. in this manner, it transmits function assigning information indicating which functions are assigned to which operation knobs, etc. to the private control system 400 (step S7), and then ends the process.

In this case, in order to assign the functions to respective operation knobs, etc., the signal processing portion 230 must grasp previously details of the console panel 430 of the private control system 400 (the number of the fader knobs 431, etc.). This respect may be satisfied by storing previously the information to indicate details of the console panel 430 of the private control system. 400 in a memory (not shown), etc. of the digital mixing system 200, or the like.

Meanwhile, the private control system 400 receives the function assigning information from the signal processing portion 230, and then assigns the functions to the fader knobs 431, etc. in accordance with the function assigning information The amateur operator operates appropriately respective operation knobs by using such private control system 400. Such operation contents are transmitted to the signal processing portion 230 from the private control system 400. The signal processing portion 230 receives the operation contents from the private control system 400, then changes the setting of the parameters (e.g., the setting of the sound volume of the third microphone) associated with the mixing process in accordance with the operation contents (e.g., the operation to increase the sound volume of the third microphone only by "2" levels, or the like), and then stores changed setting states of respective parameters in the hard disc, etc. of the control system 300 as private detailed setting information.

In this manner, the amateur operator can get the sound signals while reflecting operator's own settings (the sound volume of any microphones, etc.) upon the authorization parameters, and execute the private setting originated with the amateur operator on the basis of detailed settings by the professional operator.

As explained above, according to the sound control system of the present embodiment, even the amateur operator who is inexperienced in handling of the digital mixing system can execute the private setting in answer to the operator's likes upon setting the parameters associated with the mixing process.

Here, the parameters that can be set by using the private control system 400 are restricted in advance by the authorization parameter identifying information contained in the detailed setting information. Therefore, for example, even if the amateur operator makes a mistake in operating the private control system 400, such a trouble can be prevented beforehand that the settings of all parameters associated with the mixing process become wrong due to such operation.

The setting states of respective parameters after the private setting are stored in the hard disc, etc. of the control system 300 as the private detailed setting information. As a result, the amateur operator can reproduce easily the operator's original private setting by a simple operation such as the calling of the private detailed setting information.

In this case, the case where plural sets of the private detailed setting information are generated by one or plural amateur operators may be supposed. In order to deal with such case, identification Ids may be added to respective private detailed setting information and the private detailed setting information to which identification Ids are added respectively may be stored in the hard disc, etc.

B. Variations

With the above, one embodiment of the present invention is explained. But the above embodiment should be interpreted as a mere example, and various variation may be applied without departing from the scope of the present invention. As the variations, for example, followings may be considered.

Variation 1

In the above embodiment, the private control system 400 shown in FIG. 5 is exemplified. For example, a private control system 400' shown in FIG. 7 or a private control system 400" shown in FIG. 8 may be employed.

Figure 7:
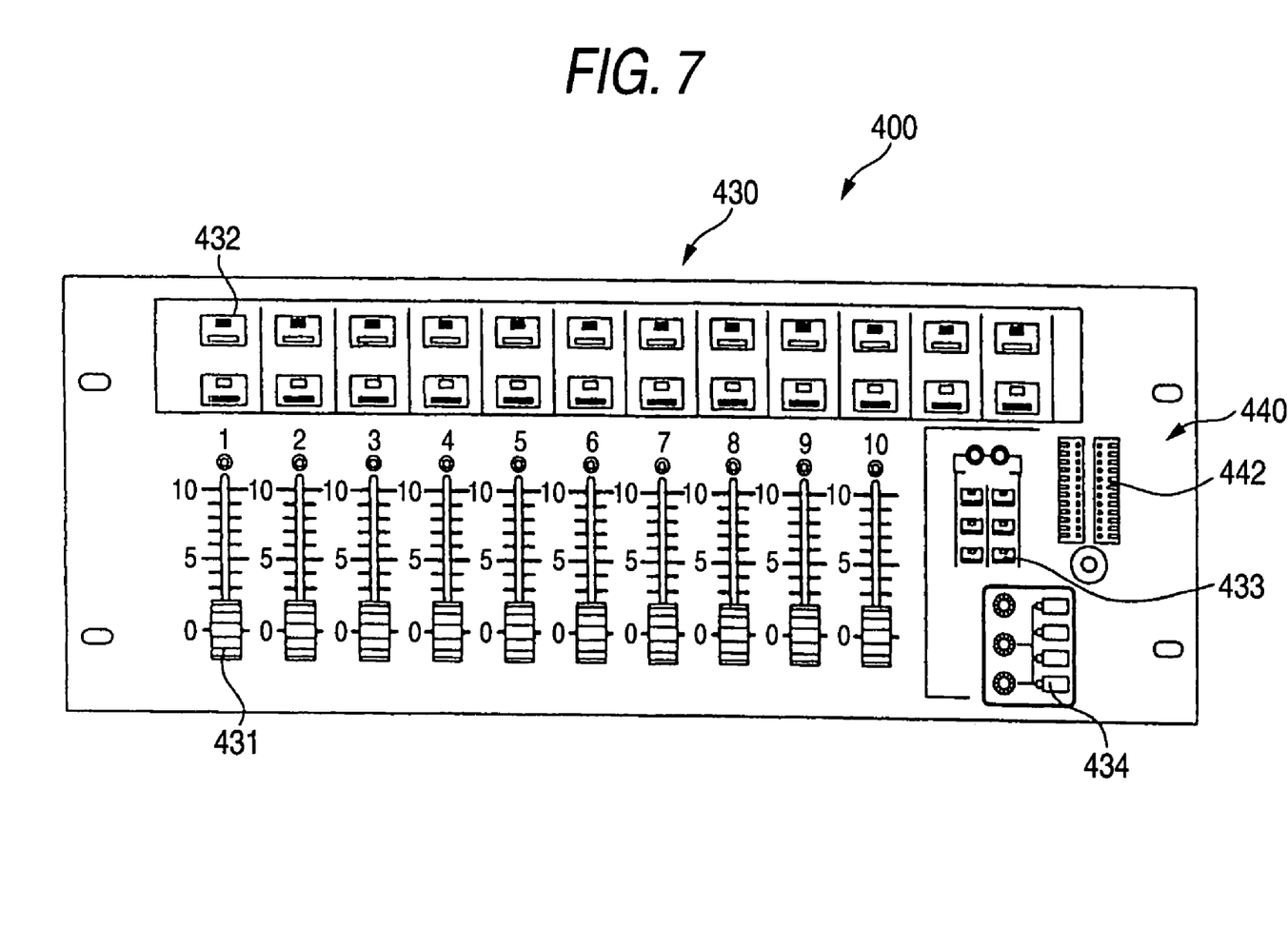
FIG. 7 is a view explaining a console panel and a display portion of a private control system according to a variation 1.

Here, the private control system 400' shown in FIG. 7 is constructed by deleting the EFFECTOR button 435, the YES/NO DIAL CURSOR button 436, the display panel 441 from the private control system 400 shown in FIG. 5. Since this private control system 400' is smaller in number of the operation buttons, etc. than the private control system 400, there is the advantage that this system is easy to handle for the amateur operator.

Figure 8:
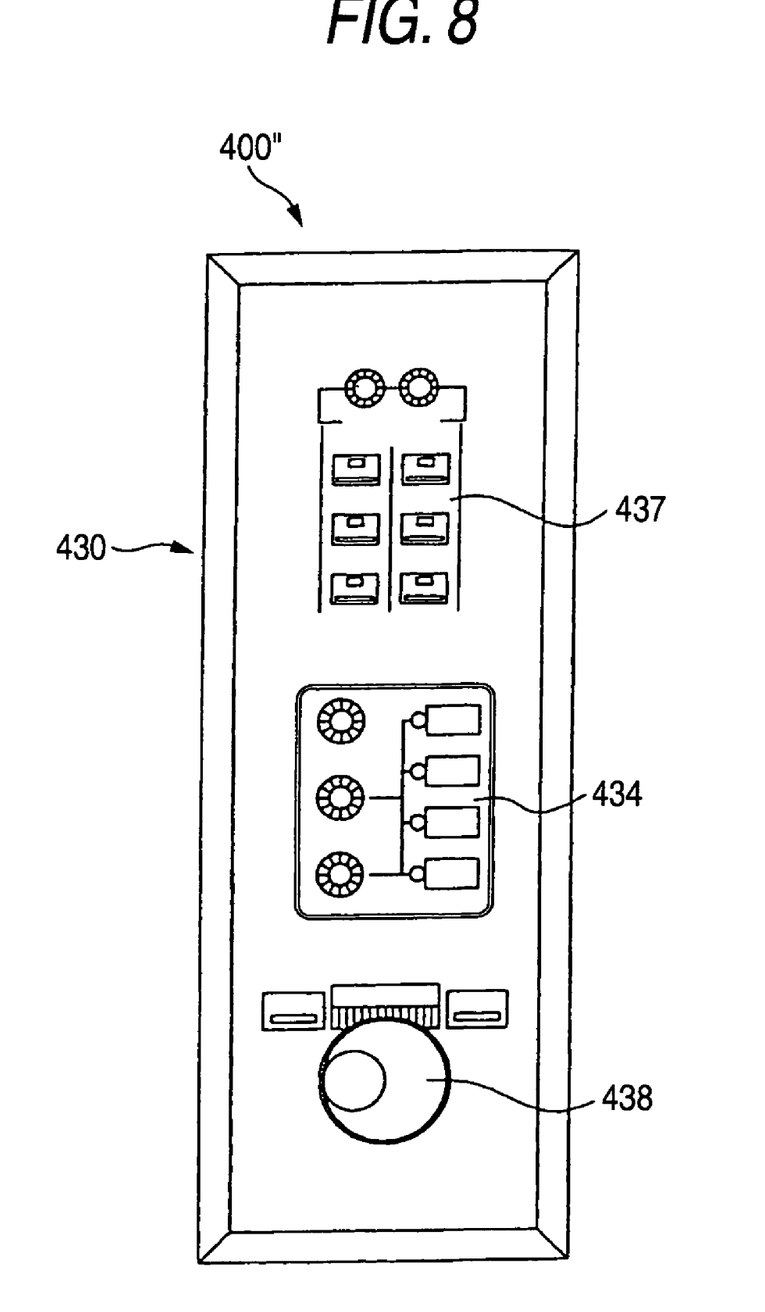
FIG. 8 is a view explaining the console panel of the private control system according to the variation 1.

The private control system 400" shown in FIG. 8 is the so-called remote-controlled private control system that does not includes the display portion 440. The PATTERN buttons 437, the EQ buttons 434, and the VOLUME dial 438 are provided on the console panel 430. According to such private control system 400", since the number of the operation buttons, etc. is further reduced rather than the private control system 400', there can be achieved the advantage that this system is easier to handle for the amateur operator.

In this case, even if the number of the operation buttons, etc. is reduced, it is possible not to reduce types and numbers of the authorization parameters to be set by assigning plural functions to one operation button, etc., for example. If the private control system 400" shown in FIG. 8 and the private control system 400 shown in FIG. 5 are compared with each other, respective functions are assigned in such a way that, for example, the same function as the first fader knob 431 shown in FIG. 5 is assigned to the VOLUME dial 438 when the PATTERN buttons 437 of the private control system 400" are operated in some combination, the same function as the second fader knob 431 shown in FIG. 5 is assigned to the VOLUME dial 438 when the PATTERN buttons 437 are operated in different combination, . . . In this manner, the types and the numbers of the authorization parameters to be set may not be reduced by assigning plural functions to one operation button, etc.

Variation 2

In the present embodiment, the case where the authorization parameters are set by using one private control system 400 is explained. But the authorization parameters may be set by using a plurality of private control systems 400. Here, if the authorization parameters are set by using two private control systems 400, for example, it may be appropriately changed which authorization parameters should be set to which private control systems 400.

By way of example, in case some detailed setting information are called by any one of the private control systems 400 and then the authorization parameter information to the effect that settings of the sound volume of the output speakers, the built-in equalizer, and the built-in effector are allowed are contained in the detailed setting information, the signal processing portion 230 of the digital mixing system 200 executes the decision to the effect that one private control system 400 is authorized to set the sound volume of the output speakers and the other private control system 400 is authorized to set the built-in equalizer and the built-in effector.

Upon such decision, the types, etc. of the private control systems, for example, may be considered. If the above two private control systems consist of the private control system 400" shown in FIG. 8 and the private control system 400 shown in FIG. 5, the private control system 400" is authorized to set the sound volume of the output speakers and the private control system 400 is authorized to set the built-in equalizer and the built-in effector. If the above two private control systems consist of the same type private control systems, it may be decided in compliance with the algorithm stored in the storing means (not shown) which parameter should be set to which private control system. In this case, the deciding method explained above is given as a mere example. According to the design of the digital mixing system 200, or the like, it is possible to change appropriately by which method the above decision should be made.

Variation 3

In the above embodiment, the signal processing portion 230 of the digital mixing system 200 decides the functions that are assigned to respective operation knobs, etc. of the private control system 400 (see step S6 shown in FIG. 6). But the control portion 410 of the private control system 400 may decide the functions that are assigned to respective operation knobs, etc.

More particularly, the signal processing portion 230 decides the authorization parameters in step S5 shown in FIG. 6 and then transmits the authorization parameter identifying information to identify the decided authorization parameters to the private control system 400. The control portion 410 of the private control system 400 receives the authorization parameter identifying information from the signal processing portion 230, and looks up an assigned function management table stored in the storing means (not shown). The authorization parameter identifying information and the functions to be assigned to respective operation knobs, etc. are correlated mutually and are registered in this assigned function management table. The control portion 410 decides the functions that are assigned to respective operation knobs, etc., by searching the assigned function management table while using the authorization parameter identifying information received from the signal processing portion 230 as a search key. In this case, since details of the function assignment are explained in the present embodiment, their explanation will be omitted herein.

As the other method, it is possible to decide the functions that are assigned to respective operation knobs, etc. by utilizing the control system 300. More specifically, in case the professional operator generates the detailed setting information by utilizing the control system 300, not only the authorization parameter identifying information to identify the authorization parameters but also the assigning function information indicating which function should be assigned to which operation knobs, etc. are generated, and then these information are contained in the detailed setting information. In this fashion, it is feasible to decide the functions that are assigned to respective operation knobs, etc. by utilizing the control system 300.

Variation 4

In the present embodiment, the signal processing portion 230 of the digital mixing system 200 decides the parameter that the private control system 400 is authorized to set, by looking up the authorization parameter identifying information contained in the detailed setting information. In this case, the authorization parameter may be decided irrespective of such authorization parameter identifying information.

More particularly, upon deciding the authorization parameters, the signal processing portion 230 decides the authorization parameters (e.g., the sound volume of the output speakers, the effect of the input channels, etc.) out of all parameters indicated in the detailed setting information and associated with the mixing process, in compliance with the authorization parameter deciding algorithm stored in the storing means (not shown).

According to such configuration, since it is not required to contain the authorization parameter identifying information in the detailed setting information, the professional operator can generate more simply the detailed setting information.

Variation 5

Figure 9:
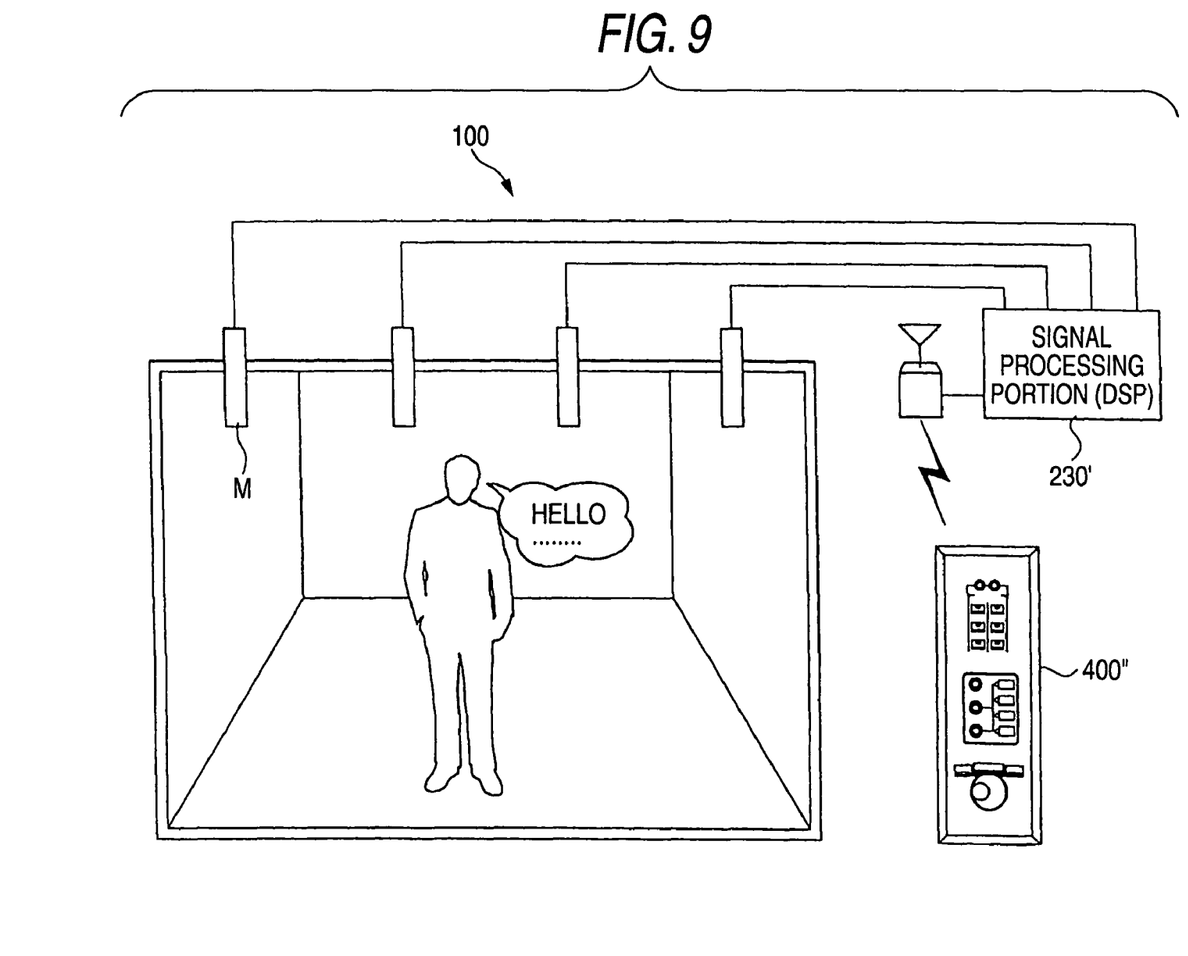
FIG. 9 is a view explaining a sound control system according to a variation 5.

FIG. 9 is a view explaining a sound control system 100' according to a variation 5.

In this case, in order to make the understanding of the invention according to the present variation easy, merely a signal processing portion 230', a plurality of highly directional microphones M connected to this signal processing portion 230', and a private control system 400" are illustrated in FIG. 9.

The highly directional microphone M is a microphone for collecting the sound emitted from a narrator. The sound signals input via respective highly directional microphones M are sent out to the signal processing portion 230'.

The signal processing portion 230' compares levels of the sound signals input from respective highly directional microphones M mutually, and then decides automatically from which highly directional microphone M the largest sound is input, etc.

Meanwhile, the private control system 400" executes the setting of the effect that is applied to the sound signal input from the highly directional microphone M that was decided as above, etc. pursuant to the operations made by the amateur operator. In this case, the signal processing portion 230' executes the control to cancel the howling, the control to select automatically another highly directional microphone M when the trouble is caused in any highly directional microphone M, etc., in addition to the above automatic decision.

In this manner, the sound signals of the speaker input from the highly directional microphones M may be decided automatically, and then the settings of the effect applied to the sound signals, etc. may be executed by the private control system 400".

Variation 6

In this case, functions of the signal processing portion 230 according to the present embodiment, etc. can be implemented by using any of the software and the hardware. If the functions are implemented by using the software, such functions may be provided to the digital mixing system 200 via the recording medium (e.g., CD-ROM) for recording the software, otherwise such functions may be provided to the digital mixing system 200 from the server containing the software via the Internet, or the like.

As described above, according to the present invention, it is feasible for the amateur operator to execute easily the setting operations of respective parameters associated with the mixing process.

What is claimed is:

1. A sound control system comprising:
a mixing unit which applies a mixing process to a plurality of sound signals input from a plurality of input systems, and outputs resultant signals to a plurality of output systems;
a storing device which stores plural sets of detailed setting information to indicate setting states of respective parameters associated with the mixing process; and
a simple control unit comprising a console panel physically separate from said mixing unit and in data communication with said mixing unit;
wherein the simple control unit includes
a plurality of operating pieces,
an instruction transmitting unit which transmits an input calling instruction to the mixing unit when a calling instruction of a certain detailed setting information is input via any operating piece out of the plurality of operating pieces, and
an assigning unit which receives an authorization parameter information corresponding to the calling instruction from the mixing unit, and assigning an parameter to the operating pieces based on the received authorization parameter information, and
wherein the mixing unit and the mixing process are controlled by the respective parameters indicated in the certain detailed setting information, wherein the mixing unit includes
a receiving unit which receives the calling instruction from the simple control unit, and
a transmitting unit, responsive to authorization parameter identifying information which identifies a predetermined subset of respective parameters that the simple control unit is authorized to modify among the respective parameters indicated in the certain detailed setting information, for a) applying the authorization parameter identification information to restrict a plurality of parameters indicated in the certain detailed setting information and associated with the mixing process, and b) transmitting the authorization parameter identifying information to the simple control unit as the authorization parameter information
wherein the mixing unit a) receives the authorization parameter identifying information and b) restricts operating a function of the simple control unit to only the authorization parameter identifying information, such that a user of the simple control unit is restricted from applying control parameters that are not among the predetermined subset.

2. The sound control system according to claim 1, wherein an operating piece assigning information to identify an operating piece to which the authorization parameter identifying information is assigned is contained in the authorization parameter information.

3. The sound control system according to claim 1, wherein the authorization parameter identifying information is contained in the detailed setting information.

4. The sound control system according to claim 1, wherein, when a plurality of simple control units are equipped, the transmitting unit decides the authorization parameter identifying information for respective simple control units in such a manner that the authorization parameter identifying information is decided differently among respective simple control units.

5. The sound control system according to claim 1, further comprising:
an information generating device which generates the detailed setting information in response to an input operation, and then storing a generated detailed information in the storing device.

6. The sound control system of claim 1 wherein the assigning unit acts to generate the authorization parameter identifying information which restricts in advance the parameters that can be set by the simple control unit.

7. The sound control system of claim 1 wherein the plural sets of detailed settings information are plural sets of predetermined detailed settings information.

8. A sound control system comprising:
a mixing unit which applies a mixing process to a plurality of sound signals input from a plurality of input systems, and outputs resultant signals to a plurality of output systems;
a first control unit physically separate from and in communication with the mixing unit and having a plurality of control input points, wherein the first control unit a) allows a user to set values of, through the plurality of control input points during the mixing process, a plurality of control parameters for controlling the mixing unit and b) allows a user to select a subset of the plurality of control parameters and stores the selected subset as authorization parameters;
a second control unit separate from the first control unit, in communication with the mixing unit, and operating a function of the mixing process assigned by the mixing unit;
wherein the mixing unit a) receives the authorization parameters from the first control unit and b) restricts operating a function of the mixing process by the second control unit and in response to the authorization parameters, such that a user of the second control unit is restricted from applying control parameters that are not among said selected subset.

9. The sound control system of claim 8, wherein the first control unit further comprises a keyboard that implements the plurality of control input points.

10. The sound control system of claim 1 further comprising:
identifying information for identifying a parameter that is authorized to change to be changed;
an identifying information notifying unit for sending to the simple control unit the identifying information included in the detailed setting information identified by the calling instruction;
a receiving unit for receiving the identifying information from the identifying information notifying unit; and
a first operating piece for selecting one of the plural sets of detailed setting information stored in the storing unit;
second operating pieces which are associated with the respective parameters, and which input values of the parameters, respectively; and
a change notification sending unit which sends to the mixing unit the parameter change notification which contains contents of the change when a type of the parameter which has been changed coincides with a type of the parameter which is authorized to be changed by the identifying information at the time the parameter is changed by any one of the second operating pieces.

11. A sound control system comprising:
a mixing unit including a control system which applies a mixing process to a plurality of sound signals input from a plurality of input systems based on instructions from said control system, and outputs resultant signals to a plurality of output systems, the mixing process is controlled by user-settable parameters which cause the mixing process to effect changes in the resultant signals based on user-settable parameters, each parameter being variable over a predefined range of values;
a storing device which stores a user-specified subset of the predefined range for at least one of said user-settable parameters; and
a simple control unit comprising a console panel physically separate from said mixing unit and in data communication with said mixing unit;
wherein the simple control unit includes:
a plurality of operating pieces, and
an instruction transmitting unit which transmits an input calling instruction to the mixing unit when a calling instruction is input via any operating piece out of the plurality of operating pieces, the input calling instruction specifying a desired value for a given one of the user-settable parameters and
wherein the mixing unit includes:
a receiving unit which receives the calling instruction from the simple control unit, and
a deciding unit that passes the desired value to the mixing unit if the desired value of the given parameter is within a user-specified subset of the range associated with the given parameter and that does not pass the desired value to the mixing unit if the desired value is not within the user-specified subset of the range.

* * * * *